United States Patent [19]

Nishiwaki

[11] Patent Number: 5,628,923
[45] Date of Patent: May 13, 1997

[54] ROBOT WELDING GUN UNIT

[75] Inventor: Toshihiro Nishiwaki, Tokyo, Japan

[73] Assignee: Obara Corporation, Tokyo, Japan

[21] Appl. No.: 531,916

[22] Filed: Sep. 21, 1995

Related U.S. Application Data

[63] Continuation of Ser. No. 257,808, Jun. 10, 1994.

[30] Foreign Application Priority Data

Oct. 20, 1993 [JP] Japan ..................... 5-284243

[51] Int. Cl.⁶ ..................... B23K 11/11
[52] U.S. Cl. ..................... 219/86.25; 219/86.41
[58] Field of Search ..................... 219/86.25, 86.33, 219/86.41, 86.51, 86.61, 89

[56] References Cited

U.S. PATENT DOCUMENTS

| | | | |
|---|---|---|---|
| 4,425,073 | 1/1984 | Mattsson | 414/730 |
| 5,091,623 | 2/1992 | Obara et al. | 219/89 |
| 5,157,234 | 10/1992 | Umeda | 219/89 |

FOREIGN PATENT DOCUMENTS

| | | | |
|---|---|---|---|
| 60-96376 | 5/1985 | Japan | 219/86.25 |
| 2-179363 | 7/1990 | Japan | |
| 5-212550 | 8/1993 | Japan | |

*Primary Examiner*—Teresa J. Walberg
*Assistant Examiner*—J. Pelham
*Attorney, Agent, or Firm*—Flynn, Thiel, Boutell & Tanis, P.C.

[57] ABSTRACT

A robot welding gun comprises a welding gun mounting bracket provided at the tip end of a robot arm, a cylinder unit incorporated in the bracket for adjusting the position of a fixed arm, a rod which is rotated or moved forward or backward by the cylinder unit and is connected to the fixed arm and a gun body which include the arm and is slidably mounted on the mounting bracket. As a result, it is possible to eliminate the variation of movement of the welding gun caused by the robot by adjusting the position of the welding gun relative to the fixed arm in accordance with the wearing amount of an electrode of the welding gun on the side of the fixed arm to always keep the same in contact with a surface of a weldment so as to provide a robot welding gun unit easy in control and capable of safe and accurate welding without generating distortion in the weldment.

9 Claims, 1 Drawing Sheet

ROBOT WELDING GUN UNIT

This application is a continuation of U.S. Ser. No. 08/257,808, filed Jun. 10, 1994.

BACKGROUND OF THE INVENTION

1. Field of The Invention

This invention relates to a robot welding gun unit which is a robot equipped with a welding gun.

2. Description of The Prior Art

Conventional robot gun units had a problem that when it proceeded to next welding operation without compensating for the wear of electrodes in preceding welding operation, which caused the formation of a gap between an electrode on the side of a fixed arm and a weldment, the gap being formed as the fixed electrode was worn away, and which caused the deformation of the weldment when the same was clamped between the electrodes for welding. In order to solve the problem, the welding gun was equipped with an equalizer unit and the gun body was supported by a spring at the time of welding to prevent the weldment from being deformed. In case of a robot welding gun, however, the welding posture of the weldment varied according to the different positions and shapes of the weldment so that the spring sometimes did not work effectively and it was difficult to adjust the spring.

Each of some robot welding guns clamps the weldment between an electrode on the side of a fixed arm and a presser electrode for welding with the fixed arm side electrode being always in contact with a surface of the weldment and with the presser electrode being advanced toward the weldment by a robot instead of the equalizer unit described above (e.g., the Japanese Patent Laid-Open Publication No. 2 179363).

The robot welding gun disclosed in the above publication, however, has a problem that it is very troublesome in control since an electrode on the side of the fixed arm is always in contact with a surface of the weldment so that the robot has to be moved variously in accordance with the wearing amount of the electrode although the generation of the gap due to the wear of the electrode can be prevented.

SUMMARY OF THE INVENTION

The present invention has been made in view of such a problem of the prior art to eliminate the variation of movement of the welding gun caused by the robot, described above, by adjusting the position of the welding gun on the side of the fixed arm in accordance with the wearing amount of the electrode. Thus allowing the electrode on the side of the fixed arm to be always in contact with a surface of the weldment and provide a robot welding gun capable of safe and accurate welding with easy control and without generating distortion in the weldment.

In order to attain the above object, the robot welding gun according to the present invention is characterized by a welding gun mounting bracket provided at, the tip end of a robot arm, a cylinder unit incorporated in the bracket for adjusting the position of the fixed arm, a rod which is rotated or moved forward or backward by the cylinder unit and is connected to the fixed arm, and a gun body which include the arm and is slidably mounted on the mounting bracket.

In the robot welding gun unit which clamps a weldment between electrodes for welding, the electrodes are gradually worn away as welding is repeated. Accordingly, the wearing amount of the electrode on the side of the fixed arm is measured by a standard plate or a sensor when the robot is in rest position to compensate the wearing amount of the electrode by driving the fixed arm positional adjusting cylinder unit to advance the gun body toward the mounting bracket by the wearing amount. Therefore, the movement of the robot does not change relative to the wearing amount of the electrode at all.

PREFERRED EMBODIMENTS OF THE INVENTION

An embodiment of the invention will be described hereinafter with reference with FIGS. 1 and 2.

Figure 1:
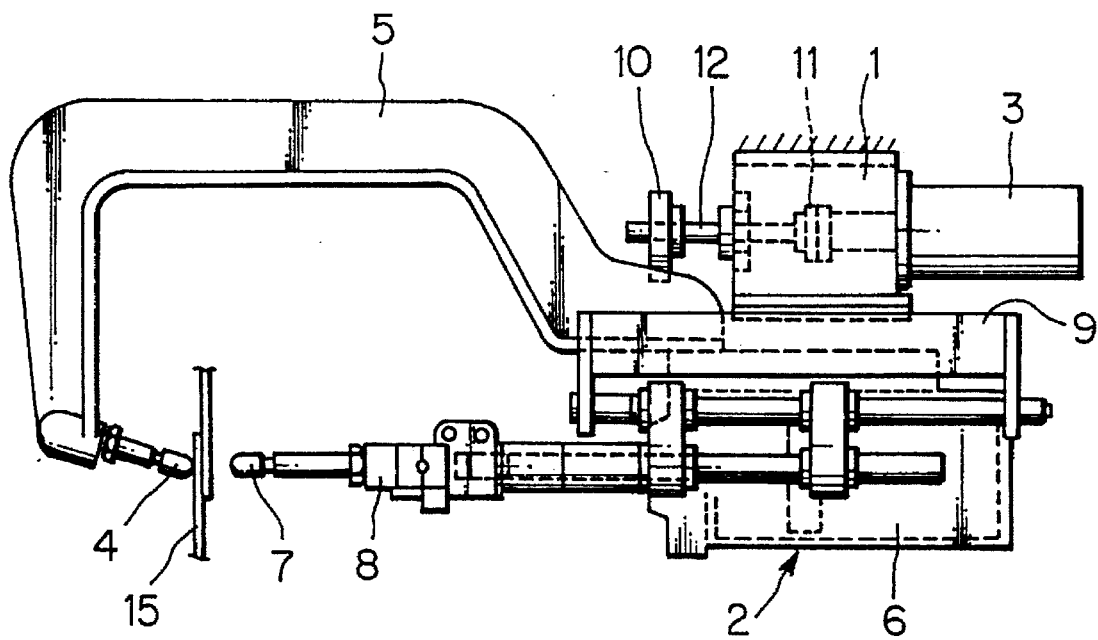
FIG. 1 is a side view of a robot welding gun unit according to an embodiment of the present invention.
Figure 2:
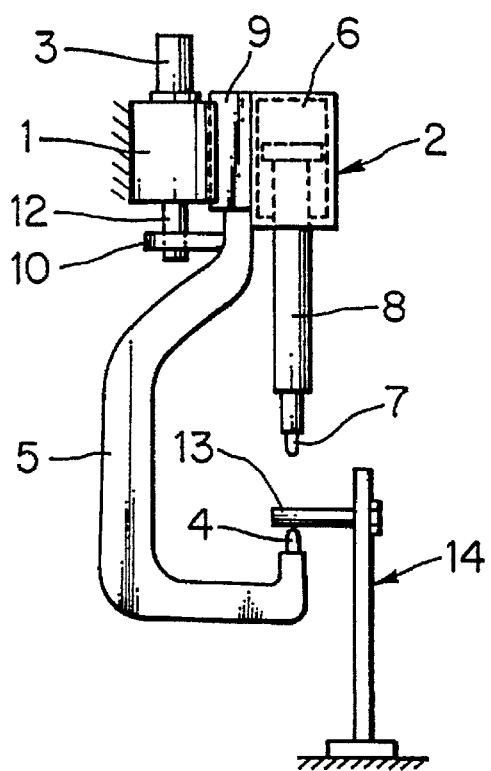
FIG. 2 is a view for explaining the operation of the robot welding gun unit including an auxiliary unit to measure the wearing amount of an electrode.

FIG. 1 is an embodiment employing a C-type gun. In the figure denoted at 1 is a bracket for mounting a welding gun body 2 on a robot arm and an electric motor 3 which constitutes a cylinder unit is fixed to the bracket 1.

The welding gun body 2 is mainly composed of a fixed arm 5 equipped with an electrode 4 at the tip end thereof, a pressure rod 8 which is moved forward or backward by a pressure cylinder 6 and is equipped with an electrode 7 at the tip end thereof and a sliding bracket 9 which is disposed on the upper surface of the pressure cylinder 6 and is slidably supported by the bracket 1.

A rod 12 of a ball screw extends between a supporting bracket 10 formed on the fixed arm 5 and the output side of the motor 3, the rod 12 being connected to the motor 3 by way of a coupler 11.

An adjusting auxiliary unit 14 having a standard plate or a sensor 13 serving as a yardstick for moving the welding gun body 2 relative to the bracket 1 according to the wearing amount of the electrode 4 on the side of the fixed arm is positioned upright at the rest position of the robot.

In case of the robot welding gun unit having the above construction according to the embodiment of the present invention, at first, the electrode 4 on the side of the fixed arm 5 is brought into contact with a surface of a weldment 15 by a robot arm. At this state, the pressure cylinder 6 is driven to advance the pressure rod 8 toward the weldment 15 until the electrode 7 at the tip end thereof is brought into contact with the weldment 15, which is then clamped between the electrodes 4 and 7 for welding. When the welding of the weldment 15 is completed, the pressure cylinder 6 returns the electrode 7 to its standby position.

After an operating cycle of welding is completed in this way, the welding gun body 2 is moved to the rest position of the robot by the robot arm, where the adjusting complementary unit 14 checks the wearing amount of the electrode 4. In case there is a gap between the standard plate or a sensor 13 and the electrode 4 due to the wear of the electrode 4, the welding gun body 2 including the electrode 4 is moved upward relative to the mounting bracket 1 in FIG. 2 by driving the motor 3 to rotate the rod 12 of ball screw until the electrode 4 is brought into contact with the sensor 13. Alternatively the gap is measured by the sensor 13 and the motor 3 may be driven to move the welding gun body 2 as far as the measured gap. The robot arm does not move while the welding gun body 2 is moved. Accordingly, the robot can keep the electrode 4 always in contact with the weldment 15 while performing a predetermined movement regardless of the wear of the electrode 4.

Although an electric cylinder unit is employed as a cylinder unit for moving the welding gun body 2 relative to the mounting bracket 1 in the above embodiment, a hydraulic or pneumatic power cylinder unit may be employed instead of the electric cylinder unit and the welding gun unit body may be of X-type instead of the C-type set forth above.

Since the robot welding gun according to the present invention has a welding gun mounting bracket at the tip end of a robot arm, a cylinder unit incorporated in the bracket for adjusting the position of the fixed arm, a rod which is rotated or moved forward or backward by the cylinder unit and is connected to the fixed arm and a gun body which include the arm and is slidably mounted on the mounting bracket, it is possible to compensate the wearing amount of an electrode when the same is gradually worn away as welding is repeated by driving the fixed arm positional adjusting cylinder unit to advance the gun body toward the mounting bracket, so that the movement of the robot does not change at all relative to the wearing amount of the electrodes, resulting in a robot welding gun unit easy in control and capable of safe and accurate welding without generating distortion in the weldment.

What is claimed is:

1. A robot welding gun which is a robot equipped with a welding gun comprising:

a welding gun mounting bracket provided at the tip end of a robot arm;

a gun body which includes mounting means for slidably mounting said gun body on said mounting bracket, said gun body including a fixed arm, which extends in a forward direction and has a tip end with a first welding electrode thereon for contacting an object to be welded, and a slidable rod having a second welding electrode on a distal end thereof, which extends forwardly toward said tip end to contact the object to be welded;

a cylinder unit attached to said mounting bracket for adjusting the position of said fixed arm relative to said mounting bracket;

a rod extending forwardly from said cylinder unit which is rotated or is moved forward or backward by said cylinder unit, said rod drivingly interconnected to said fixed arm at all times such that said fixed arm is reversibly driven both forwardly and rearwardly by said rod along a predetermined path to a selected position therealong upon rotation or movement of said rod and said fixed arm is forwardly and rearwardly restrained by said rod in said selected position when rotation or movement of said rod is stopped; and adjusting means for detecting wear on said first welding electrode when said welding gun is in a deactivated state so that said first welding electrode is maintained in said selected position regardless of wear to said first welding electrode.

2. The welding gun according to claim 1, wherein said cylinder unit is a rotating motor and said rod is drivingly interconnected by a bracket secured on said fixed arm, said bracket having an aperture therethrough for receiving said rod, said rod and said aperture of said bracket having cooperating threads engaged therebetween.

3. The welding gun according to claim 1, wherein said rod is drivingly interconnected by a bracket secured on said fixed arm and fixedly connected to said rod, said cylinder unit being a pressurized cylinder for selectively moving said rod.

4. The welding gun according to claim 1, wherein said gun body including means for moving said slidable rod forwardly toward the object to be welded while said fixed rod is fixedly restrained in said selected position to clamp the object between the first and second welding electrodes and rearwardly to release the object.

5. A robot welding gun which is a welding gun mounted on a robot arm of a robot comprising:

a welding gun mounting bracket secured to the robot arm so as to move in conjunction with the robot arm;

a gun body that includes a frame member, which has a front end and a rear end, and mounting means between said front and rear ends for slidably mounting said frame member of said gun body to said mounting bracket to facilitate forward and rearward sliding of said gun body, said gun body including a fixed arm which is fixed relative to said frame member and extends forwardly from said front end, said fixed arm terminating at a tip end which includes a rearward projecting first welding electrode, said gun body further including a slidable rod which is slidably mounted to said frame member, extends forwardly toward said tip end of said fixed arm, and includes a forward projecting second welding electrode, said gun body further including means for moving said slidable rod forwardly to clamp an object to be welded between said first and second welding electrodes and rearwardly to release the object; and an adjustment unit which is attached to said mounting bracket and includes a forward projecting adjustment rod with a distal end and a proximal end and adjusting auxiliary means for detecting wear to said first electrode, said adjustment unit including reversible actuating means engaged with said proximal end of said adjustment rod for selectively driving said adjustment rod in response to wear detected by said adjusting auxiliary means, said adjustment rod drivingly interconnected to said fixed arm at all times so that said fixed arm is reversibly driven both forwardly and rearwardly along a predetermined path to a selected position therealong in response to said driving of said adjustment rod and said fixed arm is forwardly and rearwardly restrained by said rod in said selected position when said rod is stopped.

6. The welding gun according to claim 5, wherein said actuating means is a motor for rotatably driving said adjustment rod, and said adjustment rod is drivingly interconnected by a bracket secured on said fixed arm, said bracket having an aperture therethrough for receiving said adjustment rod, said adjustment rod and said aperture of said bracket having cooperating threads engaged therebetween.

7. The welding gun according to claim 5, wherein said adjustment rod is drivingly interconnected by a bracket secured on said fixed arm and fixedly connected to said rod, said actuating means being a pressurized cylinder for selectively moving said rod forwardly and rearwardly.

8. The welding gun according to claim 5, wherein said welding gun has a welding state and a deactivated state, and wherein said adjusting auxiliary means detects wear to said first welding electrode when said welding gun is in said deactivated state.

9. A method for positioning electrodes on a robotic welding gun comprising the steps of, providing a welding gun including a frame, an adjustment means connected to said frame for moving a first arm fixed to said adjustment means, a first welding electrode on a distal end of said first arm, said first welding electrode having a tip at a predetermined position, a second arm with a second welding electrode at a distal end thereof, a motive means fixed to said frame for moving said second welding electrode into contact with an object to be welded thereby clamping the object to be welded between said first and second welding electrodes when said first and second electrodes are in an activated state;

positioning a sensor near said first electrode when said first and second electrodes are in a deactivated state;

sensing wear on said first welding electrode using said sensor; and repositioning said tip of said first welding electrode to compensate for wear thereon by activating said adjustment means, thereby adjusting said first arm and said tip of said first welding electrode so as to maintain said tip at said predetermined position without reorienting the entire robotic welding gun.

* * * * *